United States Patent [19]
Abdelmalek

[11] Patent Number: 5,146,755
[45] Date of Patent: Sep. 15, 1992

[54] METHOD FOR REDUCING FLUE GAS ACID VAPOR EMISSIONS AND ENERGY RECOVERY

[76] Inventor: Fawzy T. Abdelmalek, 12807 Willowyck Dr., St. Louis, Mo. 63146

[21] Appl. No.: 645,804

[22] Filed: Jan. 25, 1991

[51] Int. Cl.⁵ .............................. F01K 23/04
[52] U.S. Cl. ..................................... 60/655
[58] Field of Search .................. 60/655, 648

[56] References Cited

U.S. PATENT DOCUMENTS 4,126,000 11/1978 Funk ....................... 60/648

Primary Examiner—Allen M. Ostrager
Attorney, Agent, or Firm—Veo Peoples, Jr.

[57] ABSTRACT

Acidic vapors from hot flue gases are condensed and collected. The waste heat therefrom is recovered and used to produce additional electrical power.

2 Claims, 2 Drawing Sheets

METHOD FOR REDUCING FLUE GAS ACID VAPOR EMISSIONS AND ENERGY RECOVERY

BACKGROUND OF THE INVENTION

1. FIELD OF THE INVENTION

The present invention relates generally to the reduction of power plant acid rain emissions, and to the conservation and recovery of wasted energy.

2. DESCRIPTION OF THE PRIOR ART

Approximately 50% of the electric utility power produced in the United States is generated by coal fired power plants. Even low-sulfur-content coal, fed to fire the plant, emits sulfur dioxide vapors which substantially contribute to the phenomenon known as acid rain. The flue gases containing such acid rain vapors are discharged from the power plants at temperatures as high as between 400 and 450 degrees F. Otherwise, the flue gases would condense in the stack causing corrosion problems. Accordingly, methods to inhibit acid rain by cooling and condensing the acid vapors in a non-corrosive manner are essential.

The conventional means for chemical absorption processes or by cooling such flue gas and condensing the hazardous vapors by use of water scrubbers and off-site waste water holding lagoons. However, chemical solids waste and waste water holding lagoons create an environmental nuisance. That is, hazardous chemicals leak into natural water streams. Additionally, the scrubbers and the lagoon water systems are very expensive to install, operate and maintain. An additional drawback is that the heat content of the flue gases, 6 which may amount to as much as 15% of the energy employed in the plant, is routinely wasted during the scrubbing operations.

A further loss of energy occurs in exhausting and/or condensing saturated steam from the steam turbine of electric power plants fired by the coal fuel. The steam loses its latent heat of evaporation to the cooling water as the water discharges its heat into the atmosphere or finds its way into natural water streams.

In the past, attempts have been made to recover the waste heat from saturated steam, such as with a turbo generator device in U.S. Pat. No. 4,016,725; a vacuum apparatus in U.S. Pat. No. 3,760,871; and an expansion chamber in U.S. Pat. No. 4,109,470. However, such extraneous equipment is inefficient, cumbersome, unduly expensive, and plays no role in reducing acid vapor emissions from the plant.

An improved method for reducing acid vapor emissions in a non-corrosive manner, eliminating deleterious environmental hazards, and recovering the wasted energy from both the flue gases and condensing the steam, would serve to reduce the amount of coal fuel needed to generate each kilowatt hour of power generated from the plant and significantly improve the environment. Furthermore, the reduction of coal usage would reduce the amount of carbon dioxide discharged into the atmosphere per kilowatt hour and thus reduce the so called "greenhouse warming potential" of existing facilities.

Previous methods for reducing emissions from flue gases by scrubbing the waste gases and cooling the flue gases through 6 expansion in turbine devices are disclosed in U.S. Pat. No. 3,854,300, but fail to efficiently conserve energy and serve to merely displace rather than reduce the environmental problem. Previous separation of water vapor from the gas stream by absorption, such as in U.S. Pat. No. 4,265,088, does not allow recovery of waste energy, and cooling the flue gas to separate the water vapor by the direct expansion (throttling) refrigeration method disclosed in U.S. Pat. No. 4,227,647 has also proven ineffective.

In the past, those attempts made to conserve waste energy from boiler flue gases by converting such energy into useful work have been limited to high temperature (over 500 degrees F.) flue gas economizers that produce high pressure steam to drive steam turbines. Unfortunately, when flue gas emissions are below 500 degrees F. there is insufficient energy to economically produce steam at the temperatures and pressures needed to drive the steam turbine.

U.S. Pat. Nos. 3,699,777 and 4,010,378 disclosed electric generation and space conditioning systems which utilized vapor generators to vaporize motive fluid to drive a multivaned rotary expander or compressed air to drive a turbine. The object was to provide electric power and space heating to mobile living quarters such as campers, trailers, boats and remote buildings. However, such systems can not be employed with toxic acidic vapor emissions from a power plant and the vaporized motive fluid is not condensed and recycled.

The present invention fulfills the long felt need in the industry for reduction of emissions and conservation of energy while overcoming the waste water lagoon/scrubber drawbacks in the prior art.

SUMMARY OF THE INVENTION

It is therefore a principle object of the present invention to reduce hazardous power plant emissions without the need for employing water scrubbers and off-site water holding lagoons.

It is a further principle object of the present invention to recover the otherwise wasted heat of flue gas emissions in a manner that allows the heat to be converted at moderate to low temperatures into useful energy.

It is a further object of the present invention to significantly reduce the fossil fuel demand per kilowatt hour of electric utility power generation.

These objects and others which will become apparent from the following detailed description and drawings are fulfilled by incorporating a heat exchange system into the power plant emission cycle, which system employs a refrigerant as its working fluid, and by incorporating a constant entropy expander, which by isotropic expansion of the refrigerant superheated high pressure vapors, generates a secondary source of energy for the power plant.

DETAILED DESCRIPTION OF THE PRESENT INVENTION

Figure 1:
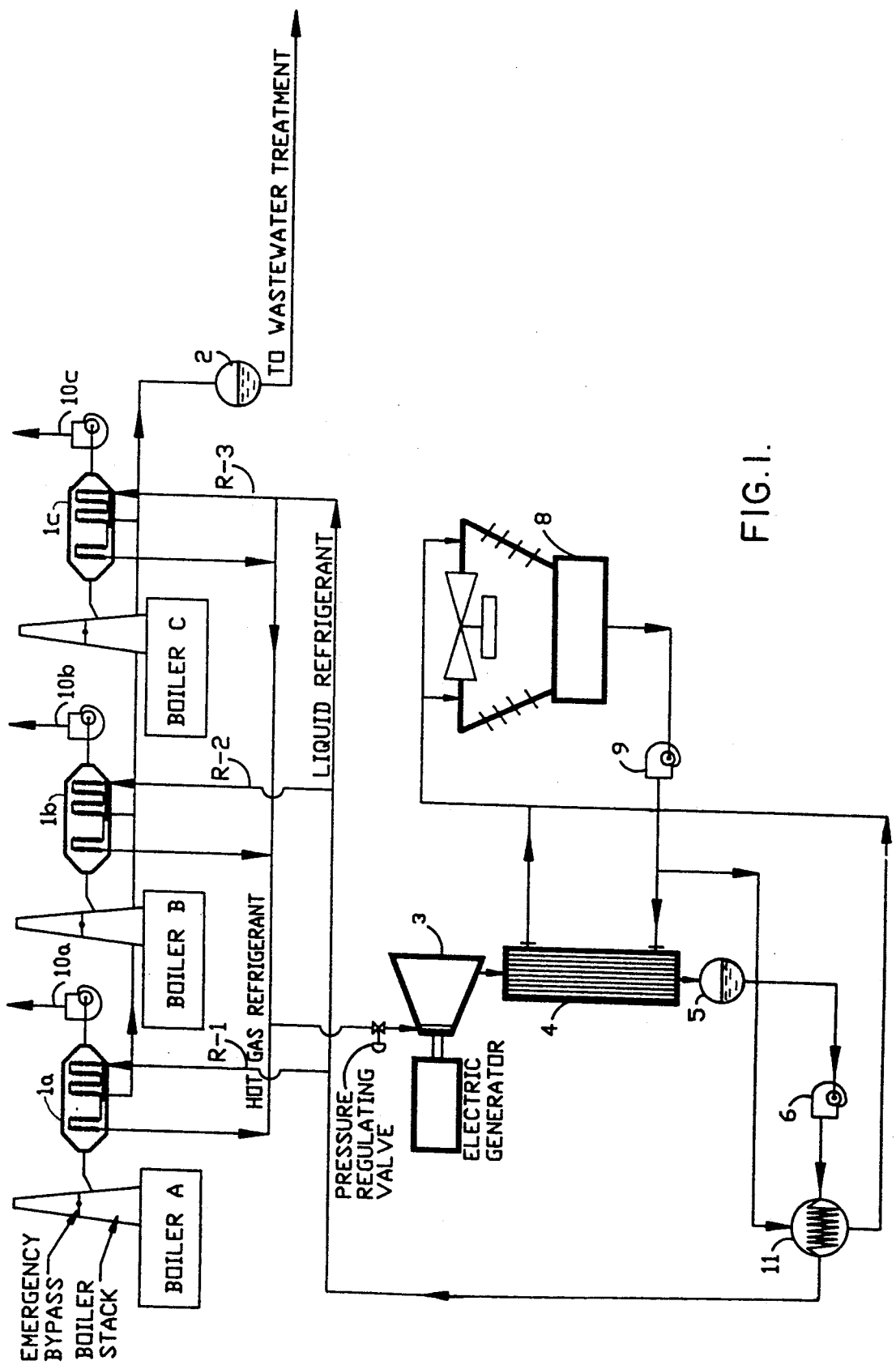
FIG. 1 is a schematic flow diagram for the power plant, boiler flue gas recovery and cooling system of the present invention.

In the process of the present invention, flue gases from the boilers of electrical power plants are continuously conducted through a conduit to a heat exchange system from 250 to 500 degrees F., preferably 350 to 450 degrees F. A refrigerant which vaporizes at such temperatures is passed through the heat exchange system as the working fluid. The refrigerant cycle is under pressure of from about 100 to 650 psia. The novel process of the present invention calls for expanding the refrigerant vapor through centrifugal gas expanders at constant entropy as opposed to ordinary gas expansion by "throttling". Centrifugal gas expanders have been used in the past to recover energy and produce power in petrochemical processing and in gas liquification, such as U.S. Pat. Nos. 4,711,093, 3,978,663, and 2,955,917, but required excessive pressures. They have not been used to produce a refrigeration effect at the essential conditions of the present invention.

Although there are prior art systems using refrigerants in heat exchange relationships, they are quite different in their application and design from those of the present invention. The prior art refrigeration effect is achieved through vapor expansion by conventional Joule-Thompson "throttling". The "throttling"takes place at constant "enthalpy" where the heat content does not change and the refrigerant temperature drop is relatively modest. On the other hand, with the vapor expansion of the present invention a refrigerant vapor is expanded at constant "entropy" and its temperature drop is far more drastic than that which would be achieved by "throttling". The heat from the refrigerant vapors, which is removed in the form of "work", (1) provides significantly more secondary power to the plant than is needed to drive the liquid refrigerant pumps and the other components of the system, and (2) provides the refrigeration effect needed to substantially condense the acid vapors.

For purposes of the present invention, low vapor condensation at the expander exhaust is preferred. Depending upon the type of refrigerant used and the operating pressures and temperatures, the expander may operate below ambient temperatures.

A number of refrigerants, including for example Freons R-11, R-12, R-500, R-22 and Refrigerant 717 (ammonia) may be employed in the present invention. The new Clean Air Act has regulated production and use of all types of refrigerants which contain chlorofluorocarbon (CFC), including R-11, R-12, R-500 and the hydrogenated chlorofluorocarbon (HCFC) chemicals which include R-22. Although, The production of these refrigerants shall be banned by the year 2000, new refrigerant products have been developed. Provided such new products prove to be safe and nonflammable, nontoxic and meet the new clean air act limit requirement for the Ozone Depletion Potential, the Greenhouse Warming Potential, and the Allowable Exposure Level, they may be employed in the present invention.

Refrigerant HCFC 123, developed for high pressure centrifugal systems replaces R-11, and refrigerant HCFC-134a for low pressure centrifugal systems, replaces R-12. These new products have been certified by the Air Conditioning and Refrigeration Institute and by the Environmental Protection Agency.

The flue gas temperatures operable in the process of the present invention may be as low as 160 to 180 degrees F. and still permit operation of the process. Subcooling of the liquid refrigerant when desired can be achieved by a liquid chilling refrigeration unit within the system.

OPERATION

In FIG. 1, liquid refrigerant R1, R2, and R3 are pumped to the heat exchangers (hot gas generators) 1A, 1B and 1C where the flue gases from three boilers A, B, and C are cooled. The exhaust streams which contain the hazardous acidic or sulfur vapors are condensed and drained to a condensate holding tank (2). The liquid refrigerant, under constant pressure is heated to above its vapor point and superheated at even higher temperature in the heat exchange zones 1A, 1B, and 1C. The vapors expand through the expander (3) producing work, and consequently the refrigerant vapor is cooled to or somewhat below the saturation temperature. The saturated refrigerant vapor then enters a condenser (4) where it condenses to a liquid and is received in a refrigerant condensate tank (5). A cooling water tower (8) and recirculating cooling water pump (9) are used to cool the refrigerant and to allow release of any residual unrecovered heat from it into the atmosphere. The refrigerant pump (6) is used to pressurize the liquid refrigerant back to the gas generating heat exchanger (1A, 1B, 1C). Optionally, a chiller (7) or direct expansion means of refrigeration may be used where the atmospheric conditions require subcooling the liquid refrigerant below the ambient dew point temperature of the water vapor in the flue gases. This assures condensation of the acidic flue gas vapors in the heat exchanger prior to the exhaust of the non-hazardous volatile into the atmosphere. An induced draft fan (10a, 10b, 10c) or other means may be used to move the combustion gases through the heat exchange structure to diffuse the exhaust gases into the atmosphere and to maintain existing negative draft static pressure conditions at the existing boiler exhaust.

The operating condenser pressures range from 60 to 140 psia and temperatures of 60 degrees F. to 100 degrees F. for the refrigerant will vary with the type of refrigerant used, changes in ambient temperature conditions and the cooling water temperature. Increased power generation occurs at lower ambient temperature conditions.

Variations in the temperatures of the flue gases entering the heat exchange zone will obviously effect the temperature and pressure of the working refrigerant fluid exiting the heat exchanger. However, the higher the flue gas temperature, the higher the efficiency of the cycle. Likewise, the temperature and pressure of the refrigerant condensate exiting the refrigerant condenser would be affective by the inlet and outlet temperature of the cooling water employed in the condenser. The lower the cooling water temperature of the condenser the higher the efficiency of the cycle.

Figure 2:
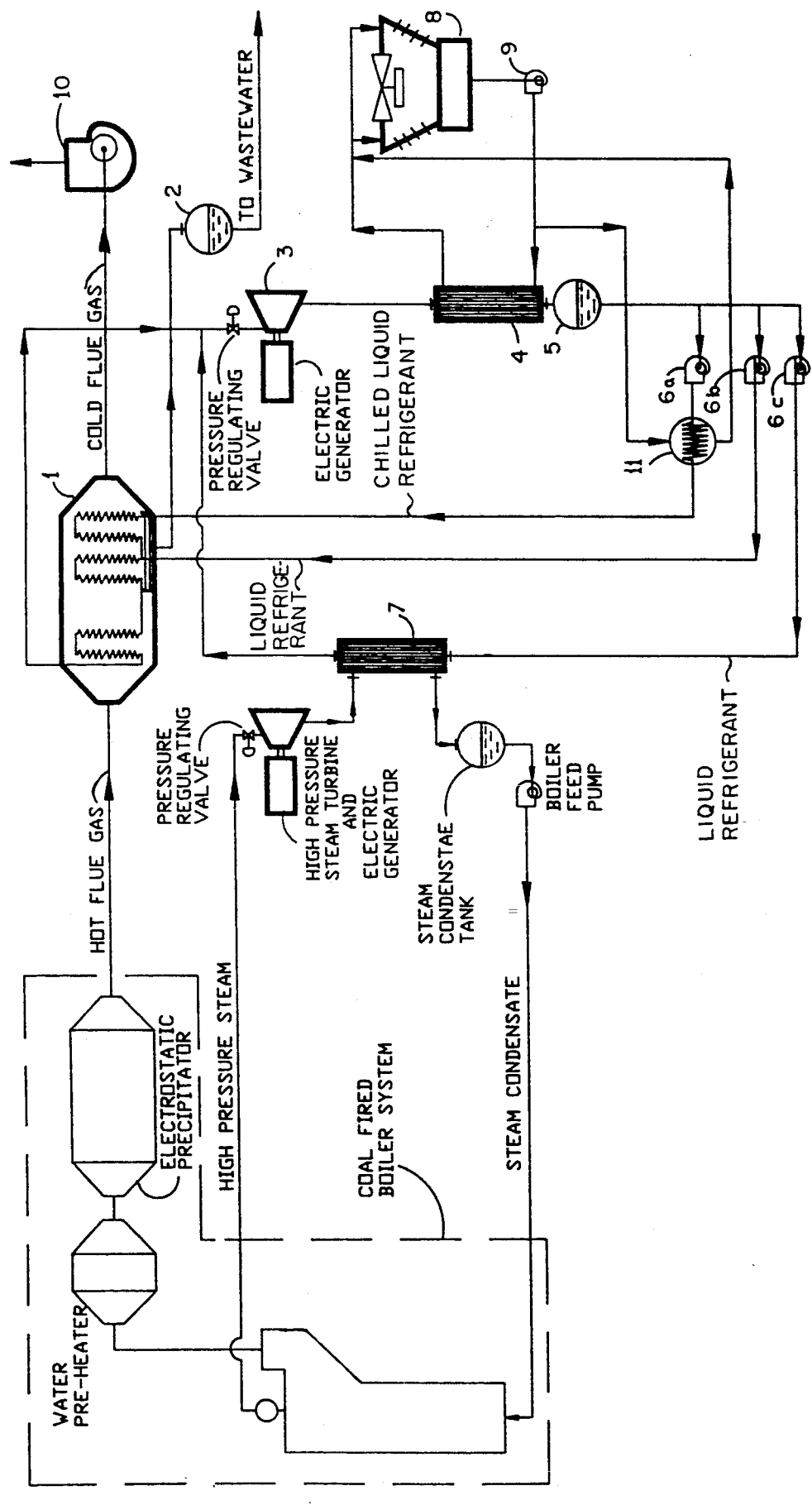
FIG. 2 is a schematic flow diagram for a combined flue gas energy recovery and turbine steam exhaust recovery system of the present invention.

FIG. 2 shows the system of the present invention isolated at one heat exchanger. An additional attribute of the embodiment illustrated at FIG. 2 is that a portion of the liquid refrigerant condensate from the expander 3 flows through refrigerant pump 6C from condenser 7 and serves to condense the high pressure steam exhaust from the high temperature turbines while recovering its heat energy. This energy would ordinarily be lost to the atmosphere as it is removed by cooling water. That portion of the liquid refrigerant, upon passage through the steam condenser, vaporizes and can thereafter be recycled to the entrance of the gas expander 3.

For each kilowatt hour of work or energy produced by normal existing power plant facilities, approximately 0.24 kilowatt hours of additional work would be produced by employing the flue gas cooling steps of the process which contribute approximately 0.06 kilowatt hours and the steam condensing step which contributes approximately 0.18 kilowatt hours. Only 10–15% of the increase in the power generated by recovered energy in the form of work is used to drive the refrigerant liquid pumps, the induced draft fans and other components of the system. Thus approximately 0.20 kilowatt hours per kilowatt hour produced by the power plant is made available from the improved method of the present invention.

The following example will illustrate the invention.

EXAMPLE

Hot flue gas at approximately 450 degrees F. exiting a steam boiler flue stack enters the heat exchange zone of a hot gas generator while steam at 1250 degrees psi, 950 degrees F. was produced in the steam boiler. The typical refrigerant employed for 18 this example is Freon R-12. The liquid refrigerant enters the heat exchange zone at 90 degrees F. and 420 psia. The superheated gas refrigerant exits the heat exchanger at from 220 F. to 230 degrees F. and 450 psia where upon it enters the expander. The saturated vapor refrigerant exits the expander into the condenser at 120 psia and 90 degrees F. The enthalpy at the expander inlet is 98 BTU per pound. The enthalpy at the expander outlet is 86 BTU per pound. The enthalpy at the condenser outlet and the heat exchange inlet (for the refrigerant) is 28 BTU per pound. The expansion occurs under constant entropy. It may be seen from this example that the heat input by the hot flue gases into the system is 70 BTU per pound. The heat rejected and absorbed by the condenser is 58 BTU per pound. The work done by the expander is 12 BTU per pound. The theoretical cycle efficiency is 17%. The approximate percentage of acidic condensate collected and which would otherwise have been either emitted to the atmosphere or carried to a waste water lagoon is 75% by weight. The remaining vapors emitted shall have sufficiently low dew point temperature so as not to constitute acid rain. The collected acidic water vapor condensate may undergo further chemical treatment to neutralize its acidity before being discharged into the natural water streams. Other treatments to produce elemental sulfur from the collected effluent are available. Tables 1 and 2 compare the conventional steam turbine system with the combined steam turbine/refrigerant system of the present invention. Table 3 below shows the plant operation conditions when comparing a conventional steam turbine system and a steam/refrigerant expander system.

TABLE 1

Coal Fired Steam Boiler
Heat Balance Per One Kilowatt Watt
Produced by the Steam Turbine

| DESCRIPTION | CONVENTIONAL STEAM TURBINE SYSTEM MASS TOTAL HEAT CONTENT FLOW | | | COMBINED STEAM/ REFRIGERANT SYSTEM MASS TOTAL HEAT CONTENT FLOW | | |
|---|---|---|---|---|---|---|
| | LB | BTU | % | LB | BTU | % |
| I. HEAT INPUT: | | | | | | |
| a. Bituminous coal @ 13,800 BTU/lb | 0.85 | 11,620 | 98.6 | 0.86 | 11,880 | 98.6 |
| b. Combustion air @ 80 F | 10.4 | 160 | 1.4 | 10.6 | 160 | 1.4 |
| c. Total Heat Input | | 11,780 | 100.0 | | 12,040 | 100.0 |
| II. HEAT OUTPUT: | | | | | | |
| a. Steam @ 1,250 psi, 950 F | 6.5 | 9,150 | 77.8 | 6.65 | 9,370 | 77.8 |
| b. Flue gas (dry) @ 450 F | 11.0 | 1,160 | 9.8 | 11.22 | 1,180 | 9.8 |
| c. Moisture in combustion air @ .02 lb/lb dry air | 0.2 | 200 | 1.7 | 0.21 | 210 | 1.7 |
| d. Moisture in coal @ .02 lb/lb coal | 0.17 | 170 | 1.4 | 0.18 | 180 | 1.5 |
| e. Unrecoverable and other loss | | 1,100 | 9.3 | | 1,100 | 9.2 |
| f. Total heat output | | 11,780 | 100.0 | | 12,040 | 100.0 |

TABLE 2

Steam Turbine Power Plant
Heat Balance and Plant Efficiency
Per One Kilowatt Hour
Produced by the Steam Turbine

| DESCRIPTION | CONVENTIONAL STEAM TURBINE SYSTEM HEAT CONTENT | | COMBINED STEAM/ TURBINE REFRIGERANT SYSTEM HEAT CONTENT | |
|---|---|---|---|---|
| | BTU | % | BTU | % |
| I. HEAT INPUT: | | | | |
| a. Bituminous coal fuel | 11,620 | 98.6 | 11,880 | 98.6 |
| b. Combustion air | 160 | 1.4 | 160 | 1.4 |
| c. Total Heat Input | 11,780 | 100.% | 12,040 | 100.% |
| II. HEAT LOSSES: | | | | |
| a. Flue gases | 1,530 | 13.0 | 430 | 3.6 |
| b. Cooling water | 5,740 | 48.7 | 6,190 | 51.4 |
| c. Unrecoverable, other | 1,100 | 9.33 | 1,170 | 9.7 |
| d. Total losses | 8,370 | 71.0% | 7,790 | 64.7% |
| III. WORK OUTPUT | | | | |
| a. Conventional steam turbine system | 3,410 | 29.0 | — | — |
| b. Combined steam/ refrigerant turbine system | — | — | 4,250 | 35.3 |

TABLE 3

Plant Operating Conditions
Comparison between Conventional Steam Turbine System
and Combined Steam/Refrigerant Turbine System

| | CONVENTIONAL STEAM TURBINE SYSTEM | COMBINED STEAM/REFRIGERANT SYSTEM |
|---|---|---|
| I. STEAM TURBINE | | |
| a. Steam inlet pressure | 1,250 psia | 1,250 psia |
| b. Steam inlet temperature | 950 °F. | 950 psia |
| c. Steam heat | 1,468 BTU/lb | 1,468 BTU/lb |
| d. Steam condenser pressure | 1.5" Hg | 15.3 Hg |

TABLE 3-continued

Plant Operating Conditions
Comparison between Conventional Steam Turbine System
and Combined Steam/Refrigerant Turbine System

|  | CONVENTIONAL STEAM TURBINE SYSTEM | COMBINED STEAM/REFRIGERANT SYSTEM |
|---|---|---|
| | | (7.51 psia) |
| e. Steam condensate temperature | 92 F | 180 F |
| f. Condensate liquid heat/lb steam | 60 BTU | 148 BTU |
| g. Condensate evaporating heat/lb steam | 1,041 BTU | 990 BTU |
| h. Steam flow rate/kwhr | 6.5 | 6.8 |
| II. REFRIGERANT TURBINE | | |
| a. Refrigerant gas inlet pressure | | 280 psia |
| b. Refrigerant gas inlet temperature | | 160 F |
| c. Refrigerant gas heat | | 93 BTU/lb |
| d. Refrigerant condensate pressure | | 120 psia |
| e. Refrigerant condensate temperature | | 90 F |
| f. Refrigerant liquid condensate heat | | 28 BTU/lb |
| g. Refrigerant condensate evaporation heat | | 56 BTU/lb |
| h. Refrigerant flow/kwh of steam turbine | | 2.0 lb/min |
| III. CONDENSER COOLING WATER | | |
| a. Cooling water inlet temperature | 75 F | 75 F |
| b. Cooling water outlet temperature | 85 F | 85 F |
| c. Condensate temperature | 90 F | 90 F |
| d. Heat rejection | 5,740 BTU | 6,255 BTU |
| e. Cooling water flow | 1.15 gpm | 1.25 gpm |
| IV. FLUE GAS | | |
| a. Stack inlet temperature | 450 F | 450 F |
| b. Stack exit temperature | 450 F | 180 F |
| c. Heat losses | 1,661 BTU | 520 BTU |

What is claimed is:

1. In combination,
an electric power plant having a continuous emission of boiler flue gases;
a conduit for conducting the flue gas emissions;
a heat exchange system for absorbing heat from the flue gas to allow for flue gas condensation and collection, and for supplying that absorbed heat to a flow of liquid refrigerant to vaporize and superheat the refrigerant;
an expander through which the superheated refrigerant gas expands at lower pressure and lower saturation temperature, and drives an impeller for the generation of power;
a condenser for further cooling and condensing the saturated refrigerant gas at constant pressure;
a refrigerant pump for pressurizing and recycling the refrigerant back through the heat exchange system from the condenser;
a second refrigerant pump through which flows a portion of the refrigerant condensate under pressure from the condenser;
a steam condenser through which flows that portion of the refrigerant condensate from said second refrigerant pump to the expander; and
a steam turbine which sends high pressure steam exhaust to the steam condenser;
wherein heat from the steam exhaust is exchanged at the steam condenser, vaporizing that portion of the refrigerant condensate flowing therethrough and allowing said refrigerant to be recycled to the expander in gaseous form under pressure from said second refrigerant pump.

2. The combination of claim 1, wherein a liquid chiller or direct expansion means is connected downstream from the refrigerant pump but before the heat exchange system.

* * * * *